United States Patent
Taylor et al.

(10) Patent No.: US 8,279,805 B2
(45) Date of Patent: Oct. 2, 2012

(54) RESIDENTIAL GATEWAY

(75) Inventors: Darrell Taylor, Lithonia, GA (US);
Alfonso Jones, Suwanee, GA (US);
Steven McDonald, Locust Grove, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 229 days.

(21) Appl. No.: 12/545,940

(22) Filed: Aug. 24, 2009

(65) Prior Publication Data

US 2011/0044347 A1   Feb. 24, 2011

(51) Int. Cl.
*H04W 4/00* (2009.01)

(52) U.S. Cl. ......... 370/328; 370/401; 709/223; 725/110

(58) Field of Classification Search .................. 370/230, 370/252, 328, 352, 389, 401; 709/223; 725/110
See application file for complete search history.

(56) References Cited

U.S. PATENT DOCUMENTS

| | | | |
|---|---|---|---|
| 5,740,176 A | 4/1998 | Gupta et al. | |
| 6,252,952 B1 | 6/2001 | Kung et al. | |
| 6,272,151 B1 | 8/2001 | Gupta et al. | |
| 7,149,474 B1 | 12/2006 | Mikhak | |
| 7,180,988 B2 | 2/2007 | Phillips et al. | |
| 2003/0161333 A1* | 8/2003 | Schain et al. | 370/401 |
| 2004/0074656 A1* | 4/2004 | Bloodworth et al. | 174/50 |
| 2004/0172657 A1 | 9/2004 | Phillips et al. | |
| 2004/0228336 A1* | 11/2004 | Kung et al. | 370/352 |
| 2004/0233860 A1 | 11/2004 | Campbell et al. | |
| 2006/0291493 A1 | 12/2006 | Schley-May et al. | |
| 2007/0276771 A1* | 11/2007 | Saeger | 705/412 |
| 2007/0277205 A1* | 11/2007 | Grannan | 725/80 |

OTHER PUBLICATIONS

2WIRE.COM: iNID, Extend Your Network Into Subscribers' Homes With the 2WIRE Homeportal iNID (Intelligent Network Interface Device), the Industry's First Outdoor Residential Gateway, search dated Jun. 9, 2009, 2 pages.
Darrell Taylor, "Network Interface Devices," U.S. Appl. No. 12/180,286, filed Jul. 25, 2008.

* cited by examiner

*Primary Examiner* — Jung Park
(74) *Attorney, Agent, or Firm* — Toler Law Group, PC

(57) ABSTRACT

A particular residential gateway includes a connector interface to receive a composite signal including voice data, video data, and network data via one or more communication lines and a power coupling device to receive power via the one or more communication lines. The residential gateway includes a voice module to route the voice data to a voice-enabled device coupled to a network interface, a video module to route the video data to a video-enabled device coupled to the network interface, and a network module to route the network data to a computing device coupled to the network interface. The residential gateway further includes a testing module to communicate test results to an external device via a data communication interface. At least one of the voice module, the video module, the network module, and the testing module is powered using the power received by the power coupling device.

20 Claims, 6 Drawing Sheets

RESIDENTIAL GATEWAY

FIELD OF THE DISCLOSURE

The present disclosure is generally related to residential gateways.

BACKGROUND

Improvements in technology have led to an increase in service providers offering so-called "triple play" services. Triple play services provide voice, video and data service to a subscriber from a single provider. Offering triple play services that meet customer expectations in an efficient manner can be challenging. For example, providing new services to a customer or terminating existing services for a customer may require dispatching one or more service technicians to customer premises. Technicians may also need to be dispatched to customer premises when a customer complains about a service outage. Occasionally, the first dispatched technician diagnoses the problem and determines that a second technician must be dispatched in order to solve the problem, lengthening service outage response time and further aggravating the customer.

DETAILED DESCRIPTION

Residential gateways and methods are disclosed. In a particular embodiment, a residential gateway includes a connector interface to receive a composite signal including voice data, video data, and network data via one or more communication lines. The residential gateway also includes a network interface and a power coupling device to receive power via at least one of the one or more communication lines. The residential gateway further includes a voice module to route the voice data to a voice-enabled device coupled to the network interface, a video module to route the video data to a video-enabled device coupled to the network interface, and a network module to route the network data to a computing device coupled to the network interface. The residential gateway includes a testing module to communicate test results to an external device via a data communication interface. At least one of the voice module, the video module, the network module, and the testing module is powered using the power received by the power coupling device.

In another particular embodiment, a method includes inserting a residential gateway into an outdoor network interface device (NID) coupled to one or more communication lines. The method also includes coupling the NID to a communication network that transmits a composite signal including voice data, video data, and network data via the one or more communication lines. The residential gateway has an input to receive the composite signal from the NID and includes at least one module that is powered by power received via at least one of the one or more communication lines.

In another particular embodiment, an apparatus includes an outdoor housing, a network interface device (NID) within the outdoor housing, and a residential gateway connected to the NID. The residential gateway includes a connector interface to receive a very high speed digital subscriber line 2 (VDSL2) signal including voice data, video data, and network data from the NID via one or more communication lines. The residential gateway also includes a power coupling device to receive power via at least one of the one or more communication lines. The residential gateway further includes a voice module to route the voice data to a voice-enabled device, a video module to route the video data to a video-enabled device, and a network module to route the network data to a computing device. The residential gateway includes a testing module to detect errors in at least one of the voice module, the video module, and the network module. The testing module can also control one or more status indicators to indicate an operational status of the residential gateway and communicates test results to an external device. At least one of the voice module, the video module, the network module, and the testing module is powered by the power coupling device.

Figure 1:
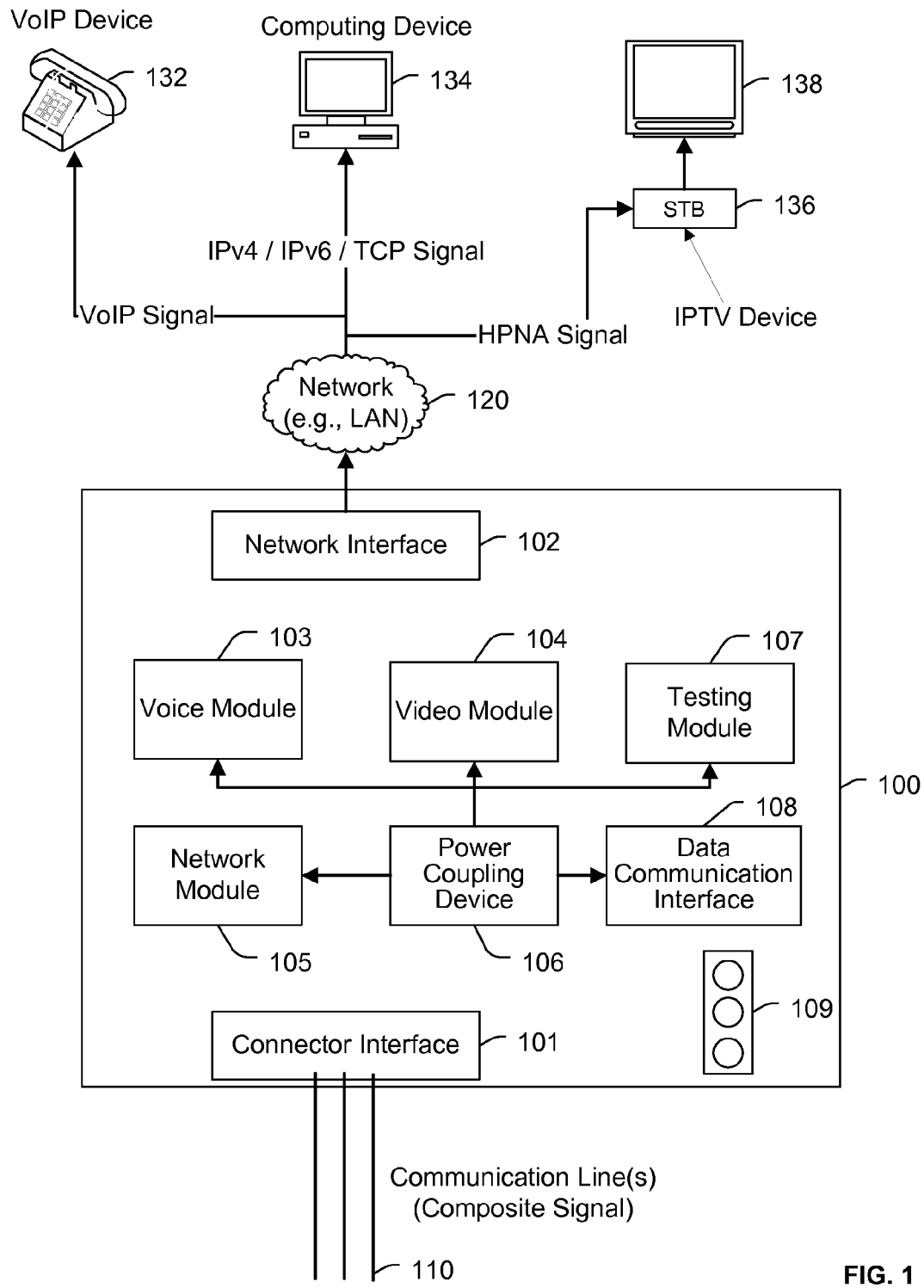
FIG. 1 is a block diagram of a particular embodiment of a system including a residential gateway.

FIG. 1 depicts a particular embodiment of a system including a residential gateway 100. The residential gateway 100 receives a composite signal 110 via one or more communication lines. In a particular embodiment, the composite signal 110 is received from a provider of triple play services. The residential gateway 100 is also coupled to a network 120. In a particular embodiment the network 120 is a local area network (LAN) located at a customer premises, such as a residence or business.

The composite signal 110 carried by the one or more communication lines may include voice data, video data, and network data. For example, the composite signal 110 may be a very high speed digital subscriber line 2 (VDSL2) signal, an asymmetric DSL2 plus (ADSL2+) signal, a fiber optic communication signal, or an optical carrier (OC) signal. In a particular embodiment, a connector interface 101 that receives the composite signal 110 is a coaxial interface.

The residential gateway 100 includes a network interface 102 coupled to the network 120 and configured to communicate with one or more devices that are also coupled to the network 120. For example, the network interface 102 may enable communication with voice-enabled devices, video-enabled devices, and computing devices. Voice-enabled devices include, but are not limited to, Voice over Internet Protocol (VoIP) devices such as a VoIP device 132. Computing devices include, but are not limited to, laptop computers and desktop computers (e.g., a computing device 134). Video-enabled devices include, but are not limited to, Internet Protocol Television (IPTV) devices such as a set-top box (STB) 136 connected to a television 138.

The residential gateway 100 includes a voice module 103, a video module 104, and a network module 105. The voice module 103 may route voice data included in the composite signal 110 to voice-enabled devices, such as the VoIP device 132. For example, the voice module 103 may extract voice data from the composite signal 110, convert the extracted voice data into a VoIP signal, and route the VoIP signal to the VoIP device 132. The video module 104 may route video data included in the composite signal 110 to video-enabled devices, such as the set-top box 136. For example, the video module 104 may extract video data from the composite signal 110, convert the extracted video data into a Home Phone line Networking Alliance (HPNA) protocol signal, and transmit the HPNA signal to the set-top box 136. The network module 105 may route network data included in the composite signal 110 to computing devices, such as the computing device 134. For example, the network module 105 may extract network data from the composite signal 110, convert the extracted network data into one or more of an Internet Protocol version 4 (IPv4) format, an Internet Protocol version 6 (IPv6) format, and Transmission Control Protocol (TCP) format, and route the IPv4/IPv6/TCP signal to the computing device 134. In a particular embodiment, one or more of the extraction and conversion operations performed by the modules 103-105 include a demodulation operation.

The residential gateway 100 also includes a testing module 107. The testing module 107 may conduct tests on one or more of the composite signal 110, the modules 103-105, the interfaces 101, 102, the network 120, the devices 132, 134, 136, and itself. For example, the testing module 107 may be configured to monitor and detect errors in the composite signal 110 (e.g., a drop in signal strength of the composite signal 110). It will thus be appreciated that the testing module 107 may monitor and detect problems both upstream (e.g., off customer premises) as well as downstream (e.g., at the customer premises) of the residential gateway 100.

The residential gateway 100 includes a data communication interface 108. In a particular embodiment, the data communication interface 108 is operable by the testing module 107 to communicate monitoring and test results to a device connected to the data communication interface 108. For example, the data communication interface 108 may be a Universal Serial Bus (USB) interface, an Ethernet interface, a serial interface, or any combination thereof. In a particular embodiment, the testing module 107 is configured to conduct tests on the data communication interface 108.

In a particular embodiment, the testing module 107 is configured to transmit test results to a provider (e.g., a triple play services vendor) of the composite signal 110 via the data communication interface 108. For example, the testing module 107 may periodically transmit monitoring and testing data to a technical support center of the triple play services vendor.

The residential gateway 100 further includes a power coupling device 106. The power coupling device 106 receives power via one or more of the communication lines carrying the composite signal 110. One or more of the modules 103, 104, 105, 107 may be powered by the power coupling module 106.

In a particular embodiment, the residential gateway 100 may include one or more status indicators 109 to indicate an operational status of the residential gateway 100. For example, the status indicators 109 may include three light emitting diodes (LEDs)—a red LED to indicate an "inoperational" status, a yellow LED to indicate a "possible error status," and a green LED to indicate a "normal" status. In a particular embodiment, the testing module 107 is configured to control the status indicators 109 based on test results produced by the testing module 107. In a particular embodiment, the status indicators 109 include audible status indicators (e.g., alarms) as well as visual status indicators.

In operation, the connector interface 101 of the residential gateway 100 may receive the composite signal 110, where the composite signal 110 includes voice data, video data, and network data. The modules 103-105 may receive power from the power coupling device 106 and may route the voice data, video data, and network data to the devices 132, 134, and 136 via the network 120. During operation, the testing module 107 may monitor and conduct tests on one or more of the components of the system of FIG. 1, control the status indicators 109 based on the test results, and transmit the test results to a provider of the composite signal 110 and to devices connected to the data communication interface 108.

It will be appreciated that a technician or other service personnel may download monitoring and testing data for the system of FIG. 1 by connecting a device to the data communication interface 108. Further, by monitoring and detecting errors both upstream and downstream of the residential gateway 100, and by transmitting test data to providers, the residential gateway 100 may reduce the time taken to fix problems that customers may experience in their voice, video, or network services. For example, a provider deploying the residential gateway 100 may know whether to send a technician specializing in solving off-premises problems (e.g., when the problem detected is upstream of the residential gateway 100) or a technician specializing in solving on-premises problems (e.g., when the problem detected is downstream of the residential gateway 100). It will also be appreciated that the power coupling device 106 may enable the residential gateway 100 to be operable without requiring a customer to provide (and pay for) electricity to the residential gateway 100.

Figure 2:
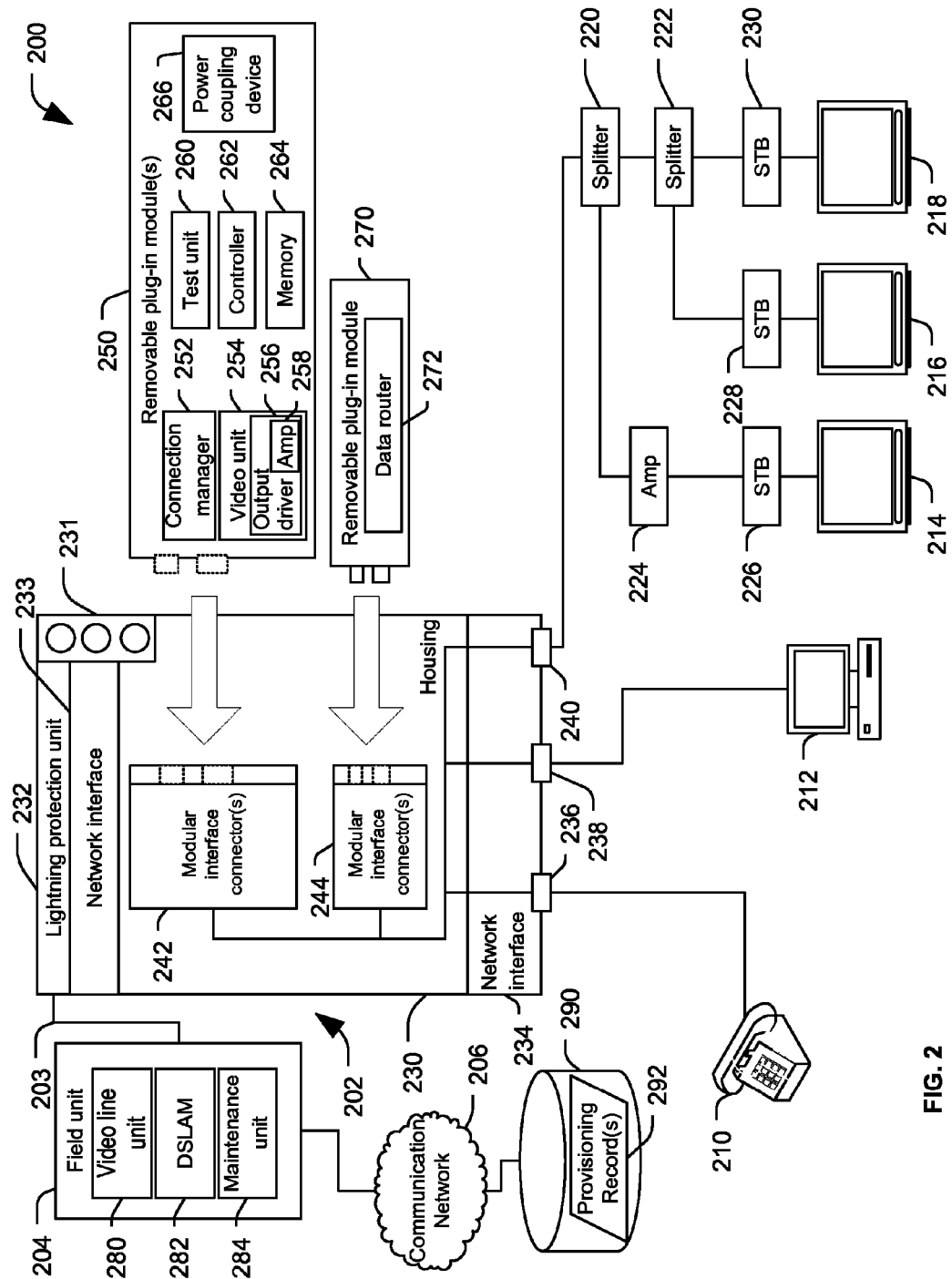
FIG. 2 is a block diagram of a first embodiment of a system including a network interface device into which the residential gateway of FIG. 1 may be inserted.

FIG. 2 depicts a first particular embodiment of a system including a network interface device. The system is designated generally 200. The system 200 includes a network interface device 202 coupled to a field unit 204 of a communication network 206. For example, the communication network 206 may be associated with a provider of triple play services. In a particular embodiment, the network interface device 202 may be attached to an exterior of a customer premise, such as a residence or business, to terminate communication lines from the communication network 206 and to terminate communication lines from the customer premise.

The network interface device 202 may receive data from the communication network 206 and distribute the data to devices at a customer residence. For example, the devices to which the data is distributed may include one or more telephones 210, one or more computers 212, one or more display devices 214-218, one or more set-top box devices 226-230, or any combination thereof. The data may include one or more of voice data, video data, and network data. The network interface device 202 may send the data to the devices via one or more intermediate devices. For example, video data may be provided to the one or more display devices 214-218 via one or more splitters 220 and 222, one or more amplifiers 224, the one or more set-top box devices 226-230, or any combination thereof.

The network interface device 202 may include a housing 230 adapted to provide climate protection to components housed therein. In a particular embodiment, the housing 230 may also be adapted to restrict access to one or more portions of the network interface device 202. For example, the network interface device 202 may include a customer accessible portion and a service provider accessible portion. The network interface device 202 may also include a lightning protection unit 232. The lightning protection unit 232 may include lightening protection coils adapted to protect electronic equipment within the network interface device 202 (at the customer's residence) from harmful effects of a lightning strike at the communication network 206, the field unit 204, the network interface device 202, or any connection point or communication line there between.

In a particular embodiment, the network interface device 202 includes a first network interface 233 including one or more connectors to terminate one or more communication lines 203 from the communication network 206. The communication lines 203 may include one or more twisted pair lines (e.g., telephone lines), one or more non-twisted lines (e.g., a T-1 line, an E-1 line or a coaxial cable line), or any combination thereof. The network interface device 202 also includes a second network interface 234 including one or more connectors 236-240 to terminate communication lines of the customer premise. The connectors 236-240 may include one or more connectors for a twisted pair line, a non-twisted pair line, and a coaxial cable line. For example, the connectors may include a standard telephone jack (e.g., an RJ11 jack), an Ethernet jack (e.g., an RJ45 jack), a coaxial line connection (e.g., an F connector), or any other local network connector to connect a wiring system at the customer premise to the network interface device 202.

In a particular embodiment, the network interface device 202 includes one or more modular interface connectors 242, 244. The modular interface connectors 242, 244 may be adapted to receive one or more removable plug-in modules that provide particular functionality to the network interface device 202. In an illustrative embodiment, the one or more removable plug-in modules include the residential gateway 100 of FIG. 1. In an illustrative embodiment, when no removable plug-in modules are provided, the network interface device may provide access only to voice service (e.g., telephone service) at the customer residence. Video service (e.g., television), network service (e.g., computer data communications), or both may be conveniently added to the network interface device 202 via the one or more removable plug-in modules. In other embodiments, other services or combinations of services available via the communication network 206 can be provided by the network interface device 202 alone or by the network interface device 202 in combination with one or more removable plug-in modules. For example, the network interface device 202 alone (i.e., without any removable plug-in modules) may not provide access to any of the services of the communication network 206. In another example, one removable plug-in module may provide access to voice, video, and network services.

In the particular example illustrated in FIG. 2, a first modular interface connector 242 is adapted to receive a first removable plug-in module 250. The first removable plug-in module 250 may include a video unit 254 to access video services available via the communication network 206. For example, the video unit 254 may include the video module 104 of FIG. 1. When the first removable plug-in module 250 is coupled to the first modular interface connector 242, the video unit 254 may be enabled to receive video data from the field unit 204 via the one or more communication lines 203 and to process the video data for communication via at least one coaxial line or at least one twisted pair line to the one or more display devices 214-218. In a particular embodiment, the video unit 254 may include an output driver 256 adapted to communicate the processed video data via wiring at the customer premise (e.g., one or more coaxial lines or one or more twisted pair lines) to at least one of the set-top box devices 226-230 for display at one or more of the display devices 214-218.

In an illustrative embodiment, the video data may include Internet Protocol Television (IPTV) data. The video data may be communicated from a video line unit 280 of the field unit 204. The video line unit 280 may modulate the video data and communicate the modulated video data via the one or more communication lines 203 to the network interface device 202. At the network interface device 202, the video unit 254 may demodulate the video data to communicate the data via the second network interface 234 to one or more devices at the customer premise. In a particular embodiment, the video line unit 280 modulates the video data in accordance with a very high speed digital subscriber line (VDSL) protocol and the video unit 254 demodulates the modulated video data to generate a Home Phoneline Networking Alliance (HPNA) protocol signal for communication via the second network interface 234 to devices at the customer premise.

In a particular embodiment, the output driver 256 may include a signal amplifier 258. The signal amplifier 258 may be adapted to amplify the processed video signal for communication to the one or more user devices coupled to the second network interface 234. In an illustrative embodiment, the network interface device 202 and the display devices 214-218 at the customer premise are coupled to a pre-existing coaxial cable network (i.e., a coaxial cable network that was installed at the customer premise before the network interface device 202 was installed at the customer premise). In this embodiment, the coaxial cable network may include one or more communication paths that are not direct paths between the network interface device 202 and the display devices 214-218 or the set top box devices 226-230. For example, the coaxial cable network may include the splitters 220 or 222, the amplifier 224, or other devices (not shown). The signal amplifier 258 may be adapted to amplify the signal sufficiently to communicate the amplified signal to the set-top box devices 226-230 or the display devices 214-218 for display.

In a particular embodiment, the first removable plug-in module 250 may also include a test unit 260. In an illustrative embodiment, the test unit 260 may implement one or more of the functionalities described herein with reference to the testing module 107 of FIG. 1. The test unit 260 may be adapted to loop signals received from the field unit 204 back to the field unit 204 in response to a signal received from the communication network 206. For example, the test unit 260 may loopback the signals in response to a loopback test signal received from a maintenance unit 284 of the field unit 204 or from the communication network 206. Loopback testing may enable the maintenance unit 284 to identify communication problems between the field unit 204 and the first plug-in module 250, or between the communication network 206 and the first plug-in module 250.

In a particular embodiment, the first removable plug-in module 250 may also include a connection manager 252. In an illustrative embodiment, the connection manager 252 may implement one or more of the functionalities described herein with reference to the testing module 107 of FIG. 1. The connection manager 252 may be operable to manage a connection to the communication network 206 via the one or more communication lines 203. For example, the connection manager 252 may be operable to communicate with the video line unit 280, a digital subscriber line modem (DSLAM) 282 or another component of the field unit 204 to condition the one or more communication lines 203 for data communication.

In a particular embodiment, the connection manager 252 or the test unit 260 may be operable to execute function testing of other components of the first removable plug-in module 250, another removable plug-in module (e.g., a second removable plug-in module 270), another component of the network interface device 202, a device at the customer premise (such as one of the set-top box devices 226-230), or any combination thereof. In an illustrative embodiment, the connection manager 252 or the test unit 260 may communicate results of the testing to the maintenance unit 284 for analysis and follow-up (e.g., to dispatch an appropriate technician to repair a detected problem). In another illustrative embodiment, the connection manager 252 or the test unit 260 may store performance data associated with the tested components at a memory 264. The connection manager 252 or the test unit 260 may analyze the performance data and communicate results of the performance data analysis to the maintenance unit 284. For example, analyzing the performance data may include comparing the performance data to one or more operational criteria associated with a particular component to identify one or more operational concerns before the operational concern becomes perceptible by a user at the customer premise. The connection manager 252 or the test unit 260 may also be adapted to provide a status display indicating whether one or more communication problems or other operational concerns have been identified. For example, the network interface device 202 may include a visual status display 231, such as red, yellow and green lights that indicate whether the network interface device 202 or one or more components of the network interface device 202 are functioning properly and able to communicate with the communication network 206, as described herein with reference to the status indicators 109 of FIG. 1.

In a particular embodiment, the first removable plug-in module 250 includes a controller 262. The controller 262 may be adapted to detect connection of the first removable plug-in module 250 to the first modular interface connector 242. In response to detecting connection of the first removable plug-in module 250 to the first modular interface connector 242, the controller 262 may automatically initialize video data processing at the video unit 254. Thus, when the first removable plug-in module 250 is connected to the first modular interface connector 242, the first removable plug-in module 250 may be automatically initiated and may automatically initiate communication with the communication network 206 to allow functionality of the first removable plug-in module 250 to be accessible to the user.

In a particular embodiment, the network interface device 202 and the one or more removable plug-in modules 250 and 270 may be line powered. For example, the first removable plug-in module 250 may include a power coupling device 266, similar to the power coupling device 106 of FIG. 1. The power coupling device 266 may be adapted to receive power via the one or more communication lines 203 from the communication network 206. The power coupling device 266 may provide operating power to the network interface device 202 and to one or more of the components of the network interface device 202 (e.g., the first removable plug-in module 250, the second removable plug-in module 270, the visual display 231, other removable plug-in modules or other components, or any combination thereof). By providing line power via one or more of the removable plug-in modules 250 and 270, no additional power interface may be required for the network interface device 202. For example, no other connection to a power source outside the network interface device 202 may be required. Additionally, by providing line power via one or more of the removable plug-in modules 250 and 270, the network interface device 202 may remain unpowered until the one or more removable plug-in modules 250 and 270 are connected to modular interface connectors 242 and 244. In a particular illustrative embodiment, each removable plug-in module 250 and 270 may include a power coupling device to provide line power for itself and/or one or more other components of the network interface device 202.

In a particular embodiment, the network interface device 202 includes the second modular interface connector 244. The second modular interface connector 244 may be adapted to receive a second removable plug-in module 270. The second removable plug-in module 270 may enable other functionality at the network interface device 202. For example, where the first removable plug-in module 250 enables access to video services, the second removable plug-in module 270 may enable access to voice services or computer data communications. In another example, other functionality may be enabled via the second removable plug-in module 270, for example administrative functions, such as line conditioning, testing, performance monitoring, power coupling, or other functions of the connection manager 252, the test unit 260, the controller 262, the memory 264, the power coupling device 266, or any combination thereof may be provided via the second removable plug-in module 270.

In a particular embodiment, the second removable plug-in module includes a data router 272. In an illustrative embodiment, the data router 272 is configured to implement one or more of the functionalities as described herein with respect to the voice module 103, the video module 104, and the network module 105 of FIG. 1. The data router 272 may be adapted to receive communication data via the one or more communication lines 203 from the communication network 206 and to route the communication data to one or more devices connected to the second network interface 234. For example, the data router 272 may receive voice data (e.g., plain old telephone service (POTS) data or VoIP data) from the communication network 206 and communicate the voice data to the telephone 210. In another example, the data router 272 may receive network data (e.g., IP data) from the communication network 206 and route the computer communication data to the computer 212. In still another example, the data router 272 may receive video data (e.g., IPTV data) from the communication network 206 and route the video data to the one or more display devices 214-218 or the one or more set-top box devices 226-230. In a particular illustrative embodiment, the data router 272 may be included on the first removable plug-in module 250, accordingly the first removable plug-in module 250 may provide video processing capability as well as data routing capability to the network interface device 202. In another particular embodiment, the data router 272, the video unit 254, the connection manager 252, the test unit 260, the controller 262, the memory 264 and the power coupling device 266 may be on any combination of the removable plug-in modules 250 and 270 allowing any combination of functionality to be provided to the network interface device 202 based on a particular configuration desired.

In a particular embodiment, the controller 262 is adapted to send a provisioning request to the communication network 206 in response to detecting connection of a removable plug-in module to one of the modular interface connectors 242 and 244. In response to the provisioning request, the communication network 206 may store a provisioning record 292 at a database 290 associated with the communication network 206. The provisioning record 292 may associate an identification for the removable plug-in module 250 or 270 with a subscriber account associated with the customer premise. The provisioning record 292 may enable provision of communication services (e.g., voice, video and/or network services) via the removable plug-in module 250 or 270 to the customer premise.

Figure 3:
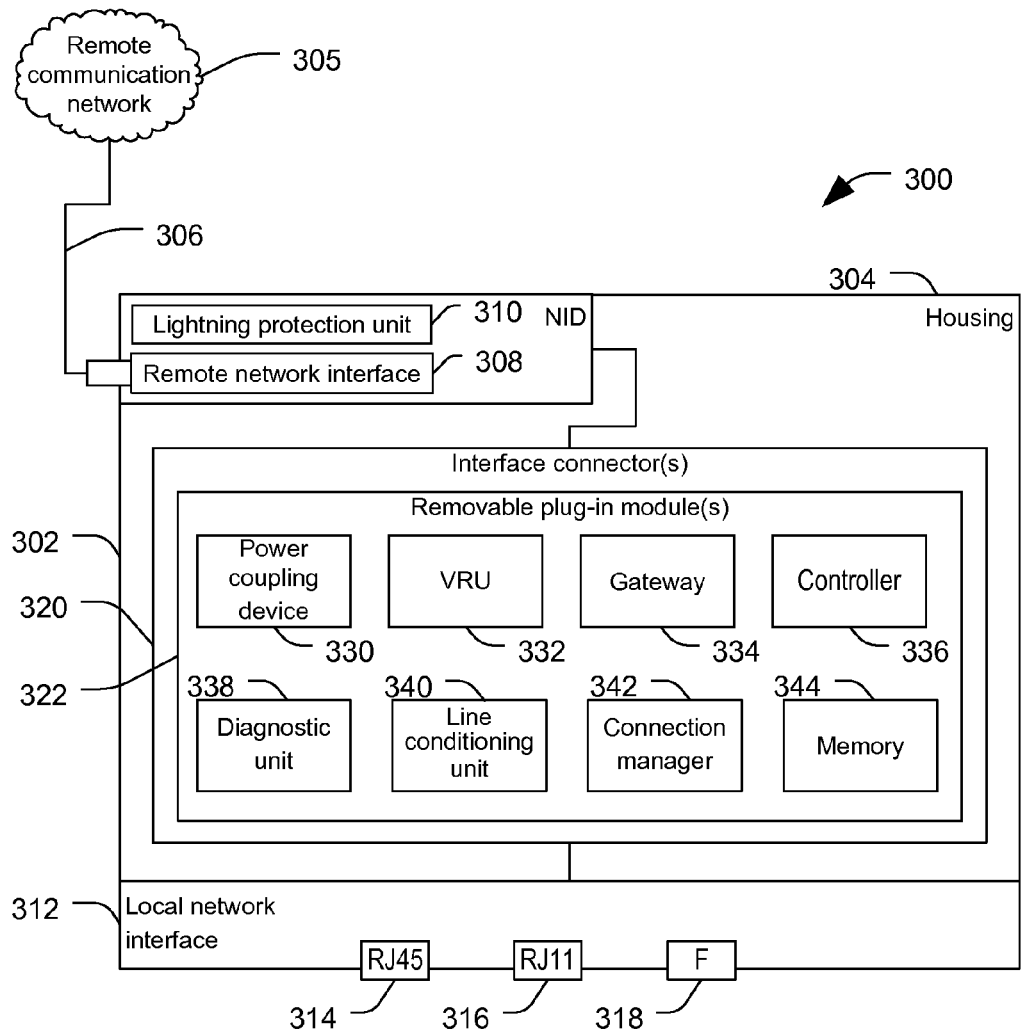
FIG. 3 is a block diagram of a second embodiment of a system including a network interface device into which the residential gateway of FIG. 1 may be inserted.

FIG. 3 depicts a second particular embodiment of a system including a network interface device. The system is generally designated 300. The network interface device 302 may be coupled via one or more communication lines 306 to a remote communication network 305. The communication lines 306 may include one or more twisted pair communication lines (e.g., telephone lines), one or more non-twisted pair communication lines (e.g., a T-1 line, an E-1 line or a coaxial communication line), or any combination thereof.

The network interface device 302 includes a housing 304 to provide physical protection to one or more components of the network interface device 302. The network interface device 302 may also include a lightning protection unit 310 and a remote network interface 308. The remote network interface 308 and lightning protection unit 310 may be coupled to the communication lines 306 to provide protection against lightning strikes and to terminate the communication lines 306. The network interface device 302 may also include one or more local network interfaces 312 to terminate one or more connections to wiring at a customer premise. For example, the local network interface 312 may include a number of interface connectors adapted to communicate data to various user devices at a customer premises. The interface connectors may include one or more modular sockets, plugs or jacks to terminate one or more twisted pair lines. For example, the interface connectors may include RJ45 jacks 314, RJ11 jacks 316, RJ14 jacks (not shown), RJ25 jacks (not shown) or any other six position or eight position plug jacks or other modular connector. The local network interface 312 may also include one or more connectors for other types of communication lines, such as coaxial cables. For example, the local network interface 312 may include one or more F connectors 318 to terminate one or more coaxial cable lines. In an illustrative embodiment, the local network interface 312 may terminate connections to wiring at the customer premise to provide voice data to one or more telephones via a modular telephone connector, to provide computer data (e.g., broadband data communications) to one or more computers via one or more Ethernet or data network connectors (such as the RJ45 connector), and to provide video data to one or more display device via one or more coaxial connectors or twisted wire pair connectors.

In a particular embodiment, the network interface device 302 may include one or more interface connectors 320. The interface connectors 320 may be adapted to receive one or more removable plug-in modules 322. The removable plug-in modules 322 may include any combination of modules which provide line power, video processing, data routing, diagnostics, line conditioning, memory, connection management or other functionality to the network interface device 302. For example, the removable plug-in modules 322 may include the residential gateway 100 of FIG. 1. In an illustrative embodiment, the removable plug-in modules 322 may include a power coupling device 330 adapted to receive power via the one or more sets of communication lines 306 and to provide operating power to other components within the network interface device 302, such as, for example, a gateway 334, a line conditioning unit 340, a video unit 332, a diagnostic unit 338, a connection manager 342, a controller 336, or any combination thereof.

In a particular embodiment, the removable plug-in modules 322 may include a video unit 332 (also called a video remote unit or "VRU"). The video unit 332 may be adapted to receive video data from the remote communication network 305 via the one or more communication lines 306. The video unit 332 may process the video data for communication via the at least one coaxial connectors 318 or one or more other connectors at the local network interface 312. For example, the video unit 332 may receive modulated video data via the communication line 306 and may demodulate the video data for distribution via the local network interface 312.

In a particular embodiment, the removable plug-in modules 322 may include a gateway module 334, such as the residential gateway 100 of FIG. 1. The gateway module 334 may route data received via the remote communication network 305 to one or more devices coupled to the local network interface 312. For example, the gateway module 334 may provide network address translation (NAT) for devices coupled to the local network interface 312. The gateway module 334 may route the data based at least partially on a type of the data. For example, voice data may be routed to a telephone or VoIP device coupled to the local network interface 312. In another example, network data (e.g., IPv4 data, IPv6 data, TCP data, or data in another computer-to-computer communication protocol) may be routed to a computing device coupled to the local network interface 312. In still another example, video data may be routed to the video unit 332 for processing or from the video unit 332 to one or more display devices or set-top box devices for display.

In a particular embodiment, the removable plug-in modules 322 include the controller 336. The controller 336 may be adapted to detect when one or more removable plug-in modules 322 are coupled to the interface connectors 320 and to automatically enable service to the one or more removable plug-in modules 322. For example, when the controller 336 detects that the video unit 332 has been plugged into the interface connectors 320, the controller 336 may send a provisioning request via the communication lines 306 to store a record at the remote communication network 305. The provisioning record may be used by the remote communication network 305 to enable the video unit 332, to enable provisioning of video data to the video unit 332.

The removable plug-in modules 322 may also include a diagnostic unit 338. In an illustrative embodiment, the diagnostic unit 338 is configured to implement one or functionalities as described herein with reference to the testing module 107 of FIG. 1. The diagnostic unit 338 is adapted to monitor performance of one or more of the removable plug-in modules 322 or other component of the network interface device 302. In an illustrative embodiment, the diagnostic unit 338 is adapted to initiate loop back testing of the communication line 306 and network interface device 302 in response to a request received via communication line 306. In another illustrative embodiment, the diagnostic unit 338 is adapted to provide a visual display or other information to indicate an operational status of the network interface device 302, one or more components of the network interface device 302, communications with the remote communication network 305, or any combination thereof. For example, the diagnostic unit 338 may be adapted to activate a green, yellow or red light to indicate whether the network interface device 302 and components therein are functioning properly.

In a particular embodiment, the removable plug-in modules 322 may include a line conditioning unit 340. The line conditioning unit 340 is adapted to condition the communication lines 306 for data communications. In a particular embodiment, the line conditioning unit 340 operates in conjunction with a remote line conditioning unit at the remote communication network to condition the communication lines 306. The removable plug-in modules 322 may also include a connection manager 342. The connection manager 342 is adapted to manage a data communication connection between the network interface device 302 and the remote communication network 305.

In a particular embodiment, the removable plug-in modules 322 may include one or more memory devices 344. The memory devices 344 may be adapted to store performance data related to one or more of the components of the network interface device 302. In a particular embodiment, each of the one or more removable plug-in modules 322 stores its performance data at the memory 344. In another particular embodiment, the controller 336 polls the one or more removable plug-in modules 322 to gather the performance data and stores the gathered performance data at the memory 344. In still another particular embodiment, the diagnostic unit 338 determines performance data related to one or more components of the network interface device 302 and stores the performance data at the memory 344. In yet another particular embodiment, the diagnostic unit 338 determines performance data related to one or more components of the network interface device 302 and analyzes the performance data. The diagnostic unit 338 stores the analyzed performance data at the memory 344 for communication via the communication line 306 to the remote communication network 305.

The one or more removable plug-in modules 322 may be arranged in any configuration, form factor, or combination. For example, any one or more of the video unit 332, the gateway 334, the power coupling device 330, the diagnostic unit 338, the line conditioning unit 340, the connection manager 342, the controller 336, and the memory 344 may be on a single module, such as an interface card. In another example, the gateway 334 and the video unit 332 may be on separate modules. In yet another example, the removable plug-in modules 322 may include a number of interface cards. Each of the interface cards may include its own power coupling device, memory, controller, diagnostic unit, line conditioning unit, connection manager or any combination thereof.

Figure 4:
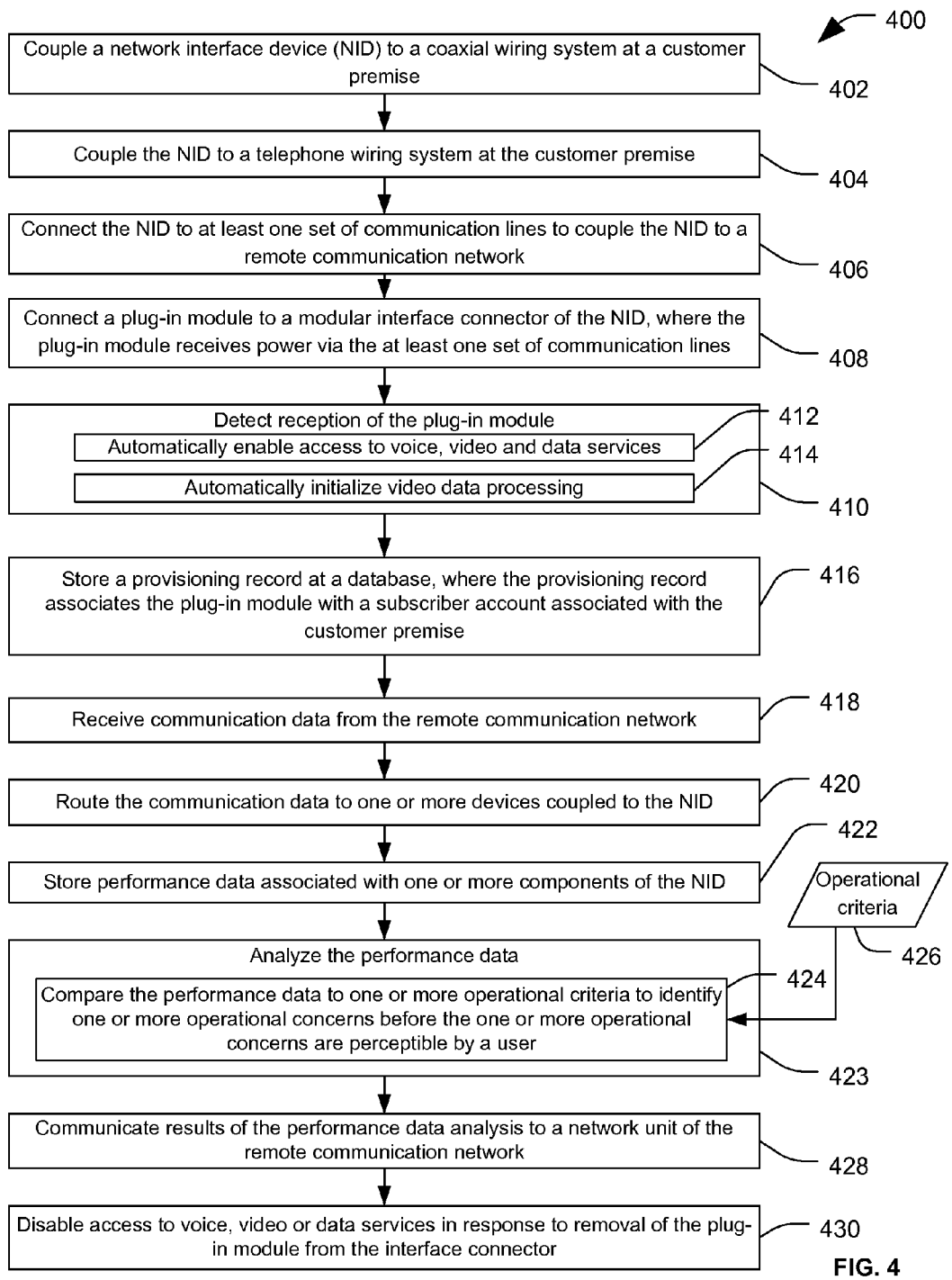
FIG. 4 is a flow chart of an embodiment of a method of using a network interface device.

FIG. 4 depicts a first particular embodiment of a method of using a network interface device, the method designated generally 400. The method 400 includes, at 402, coupling a network interface device to a coaxial wiring system at a customer premise. In a particular embodiment, the coaxial wiring system includes a pre-existing wiring system at the customer premises, such as a wiring system previously installed for cable television access. The coaxial wiring system may include one or more communication paths that are not direct connections from the network interface device to a display device or set-top box device. For example, the coaxial wiring system may include one or more splitters, one or more amplifiers, or any combination thereof. The method 400 also includes, at 404, coupling the network interface device to a telephone wiring system at the customer premise. The method 400 includes, at 406, connecting the network interface device to at least one set of communication lines to couple the network interface device to a remote communication network. For example, the set of communication lines may include one or more twisted pair lines e.g., a telephone line), one or more non-twisted pair lines (e.g., a T-1 line, an E-1 line, or a coaxial line), or any combination thereof.

The method 400 also includes, at 408, connecting a plug-in module to a modular interface connector at the network interface device. In a particular embodiment, the plug-in module is line powered, that is, the plug-in module receives power via the one or more sets of communication lines coupled to the network interface device. The one or more plug-in modules may provide particular functionality to the network interface device. For example, the plug-in modules may enable voice, video or data communications via the remote communication network at the customer premise.

In a particular embodiment, the method 400 includes, at 410, detecting reception of the plug-in module at the modular interface connector. After detecting reception of the plug-in module at the modular interface connector, the plug-in module may automatically enable access to voice, video and/or data services at the customer premises, at 412. For example, video data processing at the network interface device may be automatically initialized, at 412, in response to detecting reception of the plug-in module at the modular interface connector.

In a particular embodiment, the method 400 includes, at 416, storing a provisioning record at a database associated with the remote communication network. The provisioning record may associate the particular plug-in module received at the interface connector with a subscriber account associated with the customer premise. The remote communication network may authorize the voice, video or data services to the customer premises at the network interface device based on the provisioning record.

The method 400 includes, at 418, receiving communication data from the remote communication network. For example, the communication data may include voice, video or data communications. The method includes, at 420, routing the communication data to one or more devices coupled to the network interface device via the coaxial wiring system or the telephone wiring system. For example, voice communication data may be provided via a plain old telephone service (POTS) protocol to one or more telephones via the telephone wiring system. In another example, video data may be provided to one or more display devices or set-top box devices via the coaxial wiring system, via the telephone wiring system, or via another twisted wire pair wiring system (e.g., an Ethernet system). In another example, data communications may be routed to one or more computing devices via the coaxial wiring system, via the telephone wiring system, or via another twisted wire pair wiring system.

The method 400 also includes, at 422, storing performance data associated with one or more components of the network interface device. For example, the performance data may be stored at a memory local to the network interface device or at a database associated with the remote communication network. The method 400 may also include, at 423, analyzing the performance data. For example, analyzing the performance data may include, at 424, comparing the performance data to one or more operational criteria 426 to identify one or more operational concerns before the operational concerns are perceptible by a user at the customer premise. The method 400 may also include, at 428, communicating results of the performance data analysis to a network unit of the remote communication network. For example, the performance data analysis may be communicated to the network unit to schedule a preventative maintenance activity such as sending a technician to address the one or more operational concerns before the operational concerns are perceptible by the user. Examples of operational concerns may include failure or improper operation of one or more of the components of the network interface device, loss of communication with the remote communication network or reduced quality of a signal received from the remote communication network, loss of line power, lost data packets or receipt of corrupt data packets, and so forth.

The method 400 may also include, at 430, disabling access to voice, video, or data services in response to removing one or more of the plug-in modules from the interface connectors. For example, video services provided by the remote communication network may be automatically enabled in response to connection of a video plug-in module associated with the subscriber account to the interface connector. The video services provided by the remote communication network may be disabled in response to removal of the video plug-in module from the interface connector. In another example, data communication services provided by the remote communication network may be automatically enabled in response to connection of a data plug-in module (e.g., a residential gateway module) associated with the subscriber account to the interface connector. The data communication services provided by the remote communication network may be disabled in response to removal of the data plug-in module from the interface connector. In yet another example, voice services provided by the remote communication network may be automatically enabled in response to connection of a voice plug-in module associated with the subscriber account to the interface connector. The voice services provided by the remote communication network may be disabled in response to removal of the voice plug-in module from the interface connector. Thus, a shortened time of a technician may be used to install, enable or disable voice, video or data communication services. In a particular embodiment, a customer may enable or disable voice, video or data services by self installation of an appropriate removable plug-in module at the customer's premise, thereby reducing cost and time associated with providing a technician for installation of hardware to enable or disable services available via the remote communication network.

Figure 5:
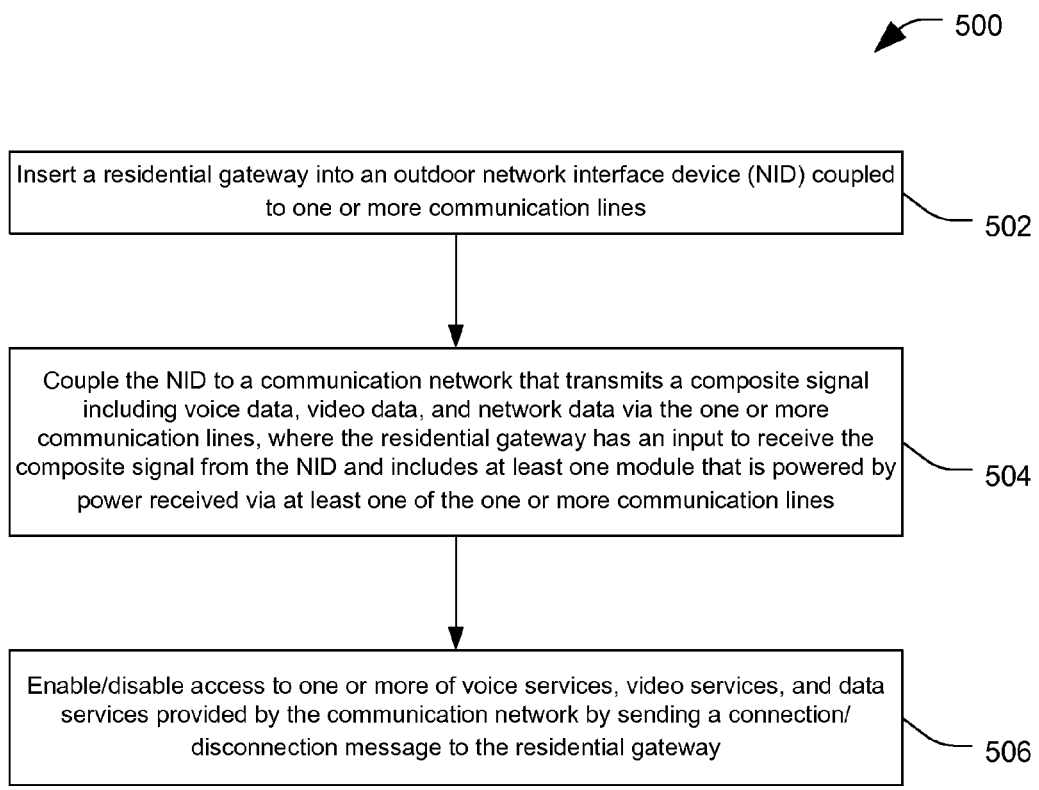
FIG. 5 is a flow chart of an embodiment of a method of using a residential gateway and a network interface device.

FIG. 5 depicts a flow chart of an embodiment of a method of using a residential gateway and a network interface device. The method is designated generally 500. In an illustrative embodiment, the method 500 is performed using the residential gateway 100 of FIG. 1 and the network interface device 202 of FIG. 2 or network interface device 302 of FIG. 3.

The method 500 includes inserting a residential gateway into an outdoor network interface device coupled to one or more communication lines, at 502. For example, the residential gateway 100 of FIG. 1 may be inserted into the NID 202 of FIG. 2.

The method 500 also includes coupling the NID to a communication network that transmits a composite signal including voice data, video data, and network data via the one or more communication lines, at 504. The residential gateway has an input to receive the composite signal from the NID and includes at least one module that is powered by power received via at least one of the one or more communication lines. For example, the NID 202 of FIG. 2 may be coupled to the communication 206.

The method 500 further includes enabling or disabling access to one or more of the voice services, video services, and data services provided by the communication network by sending a connection or disconnection message to the residential gateway, at 506. For example, a provider may enable or disable access to voice services, video services, and data services by sending a connection or disconnection message to the residential gateway 100 of FIG. 1.

In a particular embodiment, the residential gateway, the network interface devices, and removable plug-in modules described herein may allow customer self installation of particular communication services. The residential gateway, network interface devices, and removable plug-in modules may also allow installation, enabling, and disabling of services without requiring that a customer be at home in order to access hardware inside the customer premise. Additionally, the residential gateway, the network interface devices, and removable plug-in modules may provide for remote troubleshooting of communication problems via loopback testing and more detailed troubleshooting of the communication problems via onboard testing and performance monitoring. Such troubleshooting may help to distinguish between downstream problems inside the customer's premise (e.g., hardware or wiring), and upstream problems outside of the customer's premise. Further, the residential gateway, the network interface devices, and removable plug-in modules may provide for simplified error correction. For example, errors may be corrected by removing and replacing one or more removable plug-in modules at the network interface device. Additionally, the network interface device and removable plug-in modules may provide for recoverability, exchangeability and reusability of various components of the network interface device, such as a video unit, a residential gateway, a data router, a controller, a power coupling device, a line conditioning unit, a connection manager, a diagnostic unit, or a memory. Further, the residential gateway, the network interface devices, and removable plug-in modules may be adapted to communicate via communication lines having a two-wire configuration or a four-wire configuration. For example, the residential gateway and network interface devices may communicate via a standard twisted pair telephone line, via a T-1 line or via E-1 line.

Figure 6:
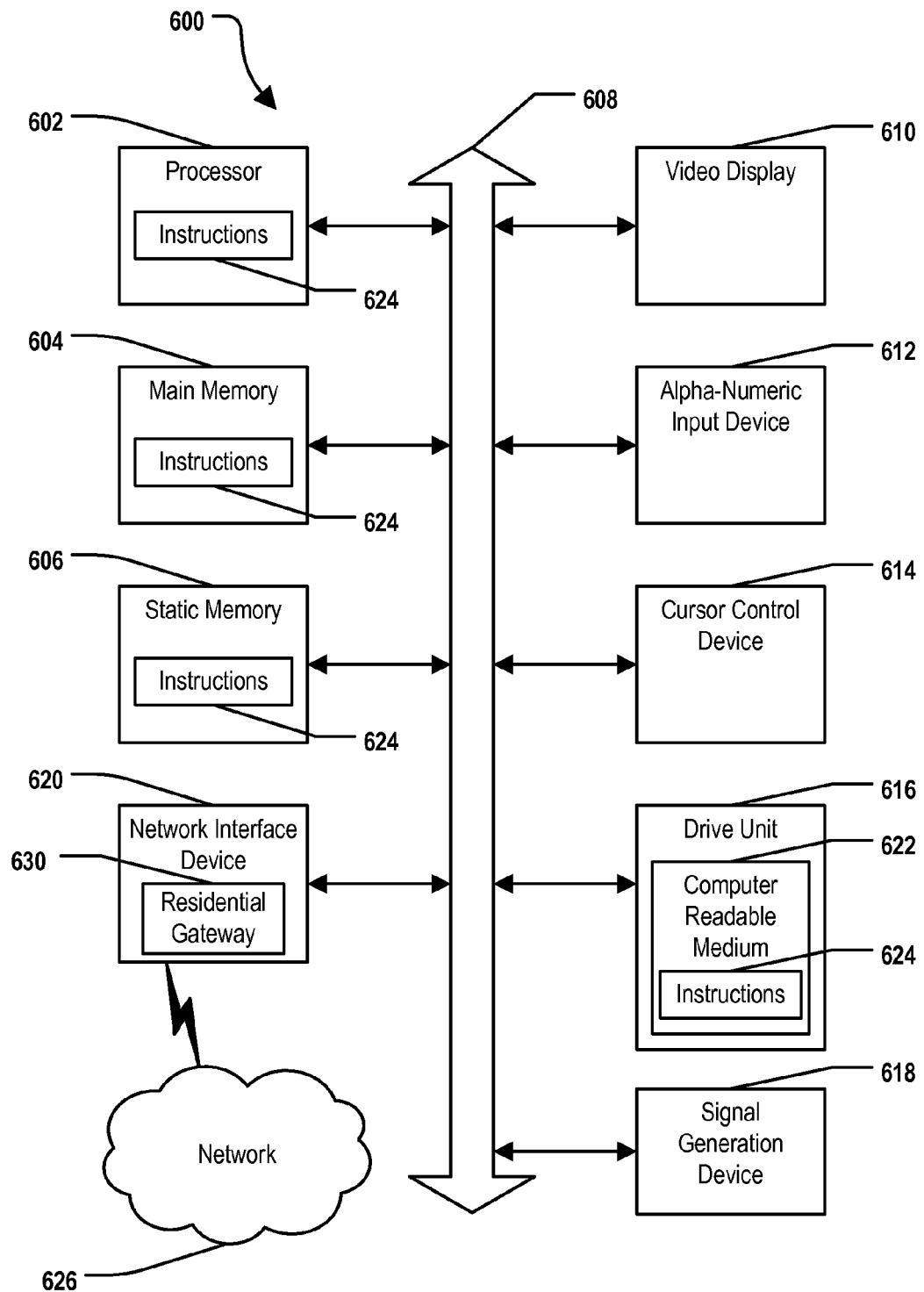
FIG. 6 is a block diagram of an embodiment of a general computer system.

Referring to FIG. 6, an illustrative embodiment of a general computer system is shown and is designated 600. The computer system 600 can include a set of instructions that can be executed to cause the computer system 600 to perform any one or more of the methods or computer based functions disclosed herein. The computer system 600 may operate as a standalone device or may be connected, e.g., using a network, to other computer systems or peripheral devices. For example, the computer system 600 may include or be included within any one or more of the databases, communication networks, field units, residential gateways, network interface devices, computing devices, or set-top box devices discussed with reference to FIGS. 1-3.

In a networked deployment, the computer system may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics processing unit (GPU), or both. Moreover, the computer system 600 can include a main memory 604 and a static memory 606 that can communicate with each other via a bus 608. As shown, the computer system 600 may further include a video display unit 610, such as a liquid crystal display (LCD), an organic light emitting diode (OLED), a flat panel display, a solid state display, or a cathode ray tube (CRT). Additionally, the computer system 600 may include an input device 612, such as a keyboard, and a cursor control device 614, such as a mouse. The computer system 600 can also include a disk drive unit 616, a signal generation device 618, such as a speaker or remote control, and a network interface device 620.

In a particular embodiment, as depicted in FIG. 6, the disk drive unit 616 may include a computer-readable medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 624 or receives and executes instructions 624, so that a device connected to a network 626 can communicate voice, video or data over the network 626. Further, the instructions 624 may be transmitted or received over the network 626 via the network interface device 620 or residential gateway 630 connected to the network interface device 620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet transmission, other packet switched network transmission (e.g., TCP/IP, UDP/IP, HTML, HTTP, IPTV, IPv4, IPv6, VoIP, VDSL, VDSL2, ADSL2+, OC, HPNA) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A residential gateway, comprising:
a connector interface to receive a composite signal comprising voice data, video data, and network data via one or more communication lines;
a network interface;
a power coupling device to receive power from at least one of the one or more communication lines, the at least one communication line powered by a source that is remote from the residential gateway;

a voice module to receive the voice data from the composite signal and to route the voice data to a voice-enabled device coupled to the network interface;

a video module to receive the video data from the composite signal and to route the video data to a video-enabled device coupled to the network interface;

a network module to receive the network data from the composite signal and to route the network data to a computing device coupled to the network interface; and a testing module to communicate test results to an external device via a data communication interface, wherein at least one of the voice module, the video module, the network module, and the testing module is powered using the power received from the at least one communication line by the power coupling device.

2. The residential gateway of claim 1, wherein the connector interface is connected to a network interface device coupled to the one or more communication lines.

3. The residential gateway of claim 1, wherein the network interface is coupled to a local area network (LAN), and wherein the voice-enabled device, the video-enabled device, and the computing device are each coupled to the network interface via the LAN.

4. The residential gateway of claim 1, wherein the voice module converts the received voice data to Voice over Internet Protocol (VoIP) data and wherein the voice-enabled device is a VoIP device.

5. The residential gateway of claim 1, wherein the video module converts the received video data to a Home Phone line Networking Alliance (HPNA) protocol and wherein the video-enabled device is an Internet Protocol Television (IPTV) device.

6. The residential gateway of claim 1, wherein the network module converts the received network data to an Internet Protocol version 4 (Ipv4) format, an Internet Protocol version 6 (Ipv6) format, a transmission control protocol (TCP) format, or any combination thereof.

7. The residential gateway of claim 1, wherein the composite signal includes at least one of a very high speed digital subscriber line 2 (VDSL2) signal, an asymmetric digital subscriber line 2 plus (ADSL2+) signal, a fiber optic communication signal, and an optical carrier (OC) signal.

8. The residential gateway of claim 1, wherein the testing module detects errors in the composite signal.

9. The residential gateway of claim 1, wherein the testing module detects errors in the voice module, the video module, the network module, or any combination thereof.

10. The residential gateway of claim 1, wherein the testing module detects errors in the voice-enabled device, the video-enabled device, the computing device, or any combination thereof.

11. The residential gateway of claim 1, wherein the testing module communicates the test results to a provider of the composite signal.

12. The residential gateway of claim 11, wherein the provider is a triple play services provider, and wherein the source is within a central office.

13. The residential gateway of claim 1, wherein the data communication interface includes a universal serial bus (USB) interface, an Ethernet interface, a serial interface, or any combination thereof.

14. The residential gateway of claim 1, wherein the testing module controls one or more status indicators to indicate an operational status of the residential gateway.

15. The residential gateway of claim 14, wherein the one or more status indicators includes one or more light emitting diodes (LEDs).

16. The residential gateway of claim 14, wherein the operational status includes a normal status, a possible error status, an inoperational status, or any combination thereof.

17. A method comprising:

in response to detecting that a residential gateway device has been coupled to a network interface device, receiving power at the network interface device, wherein the network interface device is coupled to one or more communication lines, and wherein the residential gateway device includes a power coupling device to receive power from at least one of the one or more communication lines, the at least one communication line powered by a source that is remote from the residential gateway; and receiving, at the residential gateway device, a composite signal comprising voice data, video data, and network data via the one or more communication lines, wherein the residential gateway includes at least one module that is powered by at least a portion of the power received by the power coupling device.

18. The method of claim 17, further comprising in response to receiving a connection message at the residential gateway device from a service provider via at least one of the communication lines, automatically enabling access to one or more of voice services, video services, and data services provided by the service provider.

19. The method of claim 17, further comprising in response to receiving a disconnect message at the residential gateway device from a service provider via at least one of the communication lines, automatically disabling access to one or more of voice services, video services, and data services provided by the service provider.

20. An apparatus comprising:

a housing;

a network interface device within the housing;

a residential gateway connected to the network interface device, the residential gateway comprising:

a connector interface to receive a very high speed digital subscriber line 2 (VDSL2) signal comprising voice data, video data, and network data from the network interface device via one or more communication lines;

a power coupling device to receive power from at least one of the one or more communication lines, the at least one communication line powered by a source that is remote from the residential gateway;

a voice module to receive the voice data and to route the voice data to a voice-enabled device;

a video module to receive the video data and to route the video data to a video-enabled device;

a network module to receive the network data and to route the network data to a computing device; and a testing module to detect errors in at least one of the voice module, the video module, and the network module, to control one or more status indicators to indicate an operational status of the residential gateway, and to communicate test results to an external device, wherein at least one of the voice module, the video module, the network module, and the testing module is powered by the power received by the power coupling device.

* * * * *

UNITED STATES PATENT AND TRADEMARK OFFICE
CERTIFICATE OF CORRECTION

PATENT NO. : 8,279,805 B2  
APPLICATION NO. : 12/545940  
DATED : October 2, 2012  
INVENTOR(S) : Darrell Taylor et al.

Page 1 of 1

It is certified that error appears in the above-identified patent and that said Letters Patent is hereby corrected as shown below:

In the Claims section, Column 17, Claim 6, Lines 38-40, "Protocol version 4 (Ipv4) format, an Internet Protocol version 6 (Ipv6) format, a transmission control protocol (TCP) format, or any combination thereof." should read --Protocol version 4 (IPv4) format, an Internet Protocol version 6 (IPv6) format, a transmission control protocol (TCP) format, or any combination thereof.--.

Signed and Sealed this  
Thirtieth Day of July, 2013

Teresa Stanek Rea  
*Acting Director of the United States Patent and Trademark Office*